US012265519B2

(12) United States Patent
Wright

(10) Patent No.: US 12,265,519 B2
(45) Date of Patent: Apr. 1, 2025

(54) CHANGE MANAGEMENT PROCESS FOR IDENTIFYING INCONSISTENCIES FOR IMPROVED PROCESSING EFFICIENCY

(71) Applicant: Truist Bank, Charlotte, NC (US)

(72) Inventor: Gregory Wright, Kennesaw, GA (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 17/660,698

(22) Filed: Apr. 26, 2022

(65) Prior Publication Data

US 2023/0342351 A1  Oct. 26, 2023

(51) Int. Cl.
| | | |
|---|---|---|
| G06F 16/23 | (2019.01) | |
| G06F 16/16 | (2019.01) | |
| G06F 16/178 | (2019.01) | |
| G06F 18/214 | (2023.01) | |
| G06N 3/044 | (2023.01) | |

(52) U.S. Cl.
CPC ........ *G06F 16/2365* (2019.01); *G06F 16/164* (2019.01); *G06F 16/178* (2019.01); *G06F 18/2155* (2023.01); *G06N 3/044* (2023.01)

(58) Field of Classification Search
CPC .. G06F 16/2365; G06F 16/164; G06F 16/178; G06F 18/2155; G06N 3/044
USPC ....................................................... 707/769
See application file for complete search history.

(56) References Cited

U.S. PATENT DOCUMENTS

| | | | |
|---|---|---|---|
| 9,813,450 B1 | 11/2017 | Wasiq | |
| 10,298,395 B1 * | 5/2019 | Schiatti | ................. H04L 9/3218 |
| 10,387,506 B2 * | 8/2019 | Mishra | ................. G06F 16/9535 |
| 10,528,532 B2 * | 1/2020 | Papotti | ................... G06F 16/215 |
| 10,726,000 B1 * | 7/2020 | Fortney | ................. H04L 9/3239 |
| 10,999,391 B2 * | 5/2021 | Hwang | ............... H04L 65/1045 |
| 11,017,695 B2 * | 5/2021 | Buras | ..................... A61B 8/467 |
| 11,042,506 B2 | 6/2021 | Aksionkin | |
| 11,604,833 B1 * | 3/2023 | Hertel | ............... G06F 16/90335 |

(Continued)

OTHER PUBLICATIONS

Buduma, Nikhil & Nicholas Lacascio, "Fundamentals of Deep Learning", Jun. 2017, O'Reilly Media, Inc., First edition, 298 pages. (Year: 2017).

(Continued)

*Primary Examiner* — Hanh B Thai
(74) *Attorney, Agent, or Firm* — Michael A. Springs, Esq.; Shumaker, Loop & Kendrick, LLP; Patrick B. Horne

(57) ABSTRACT

A system for determining whether inconsistencies exist in an entity's shared databases using a machine learning model. The system includes a repository having a plurality of databases that store data and information in a format accessible to users, and a back-end server operatively coupled to the repository and being responsive to the data and information from all of the databases. The back-end server includes a processor for processing the data and information, a communications interface communicatively coupled to the processor, and a memory device storing data and executable code. The code causes the processor to collect data and information from the databases, store the collected data and information in the memory device, process the stored data and information through the machine learning model to determine whether inconsistencies in the data exist in the databases, and transmit a communication on the interface identifying whether inconsistencies do exist in the databases.

10 Claims, 6 Drawing Sheets

(56) References Cited

U.S. PATENT DOCUMENTS

| | | | |
|---|---|---|---|
| 11,636,390 B2* | 4/2023 | Ranco | G06F 17/18 |
| | | | 706/12 |
| 11,651,373 B2* | 5/2023 | Kapur | G06Q 20/4016 |
| | | | 707/602 |
| 11,726,999 B1* | 8/2023 | Vig | G06N 20/00 |
| | | | 707/718 |
| 11,790,279 B2* | 10/2023 | Sreekumari | G06N 20/10 |
| | | | 706/12 |
| 2004/0093315 A1* | 5/2004 | Carney | G06N 3/08 |
| | | | 706/15 |
| 2004/0186815 A1* | 9/2004 | Stockfisch | G06N 3/08 |
| | | | 706/21 |
| 2007/0087756 A1* | 4/2007 | Hoffberg | G06Q 10/06375 |
| | | | 455/450 |
| 2010/0169348 A1 | 7/2010 | Maro | |
| 2012/0054157 A1* | 3/2012 | Fukasawa | H04W 8/20 |
| | | | 707/690 |
| 2012/0330908 A1* | 12/2012 | Stowe | G06F 16/258 |
| | | | 707/693 |
| 2015/0363612 A1 | 12/2015 | Li | |
| 2016/0147799 A1* | 5/2016 | Cohen | G06F 16/2365 |
| | | | 706/12 |
| 2016/0154830 A1* | 6/2016 | Papotti | G06F 16/25 |
| | | | 707/692 |
| 2016/0283574 A1* | 9/2016 | Anderson | G06F 16/24534 |
| 2016/0307098 A1* | 10/2016 | Goel | G06N 3/045 |
| 2017/0228645 A1* | 8/2017 | Wang | G06N 3/084 |
| 2017/0308557 A1 | 10/2017 | Cassidy | |
| 2018/0075527 A1 | 3/2018 | Nagla | |
| 2018/0293462 A1* | 10/2018 | Ambati | G06N 5/022 |
| 2018/0302417 A1* | 10/2018 | Wilson | H04L 9/3271 |
| 2019/0114334 A1 | 4/2019 | Gunther | |
| 2019/0132409 A1* | 5/2019 | Hwang | H04L 65/61 |
| 2019/0180188 A1* | 6/2019 | Liang | G06N 3/086 |
| 2019/0259470 A1* | 8/2019 | Olafson | G16B 50/10 |
| 2019/0347670 A1 | 11/2019 | Abramson | |
| 2020/0104688 A1* | 4/2020 | Benyahia | G06F 18/24 |
| 2020/0126126 A1* | 4/2020 | Briancon | G06N 20/20 |
| 2020/0134067 A1 | 4/2020 | Villard | |
| 2020/0142883 A1* | 5/2020 | Thapar | G06F 21/645 |
| 2020/0151288 A1* | 5/2020 | Ma | G06F 30/327 |
| 2020/0151289 A1* | 5/2020 | Sikka | G06N 3/063 |
| 2020/0167669 A1 | 5/2020 | Lei | |
| 2020/0210407 A1* | 7/2020 | Yang | H04L 9/0637 |
| 2020/0210455 A1 | 7/2020 | Margel | |
| 2020/0267163 A1* | 8/2020 | Wilson | H04L 9/3271 |
| 2020/0285948 A1* | 9/2020 | Baker | G06F 18/24 |
| 2020/0301896 A1* | 9/2020 | Borsos | G06F 21/554 |
| 2020/0311308 A1 | 10/2020 | Arbuckle | |
| 2020/0335098 A1 | 10/2020 | Saito | |
| 2020/0364205 A1* | 11/2020 | Novotny | H04L 9/3239 |
| 2020/0401383 A1* | 12/2020 | Singi | H04L 9/3239 |
| 2021/0081400 A1* | 3/2021 | Park | H04L 9/0637 |
| 2021/0103937 A1* | 4/2021 | Joglekar | G06F 21/552 |
| 2021/0142158 A1* | 5/2021 | Agrawal | H03M 13/1111 |
| 2021/0149867 A1* | 5/2021 | Grabill | G06N 3/04 |
| 2021/0157858 A1* | 5/2021 | Stevens | G06F 40/237 |
| 2021/0174257 A1 | 6/2021 | Pothula | |
| 2021/0201412 A1* | 7/2021 | Goh | G06Q 40/02 |
| 2021/0248149 A1* | 8/2021 | Somani | G06F 40/30 |
| 2021/0256032 A1 | 8/2021 | Burbank | |
| 2021/0357850 A1* | 11/2021 | Cella | H04L 67/1097 |
| 2021/0357959 A1* | 11/2021 | Cella | G06F 18/2178 |
| 2021/0398205 A1* | 12/2021 | Rule | G06N 20/00 |
| 2022/0100770 A1 | 3/2022 | Gimple | |
| 2022/0103589 A1* | 3/2022 | Shen | G06Q 10/0635 |
| 2022/0197697 A1* | 6/2022 | Bequet | G06F 9/5038 |
| 2022/0383111 A1* | 12/2022 | Baker | G06N 3/045 |
| 2022/0398583 A1 | 12/2022 | Crudele | |
| 2022/0400123 A1 | 12/2022 | Ayoub | |
| 2023/0155817 A1 | 5/2023 | Koren | |
| 2023/0177041 A1* | 6/2023 | Oh | G06F 21/64 |
| | | | 707/690 |
| 2023/0222137 A1* | 7/2023 | Aucinas | H04L 63/10 |
| | | | 707/802 |
| 2023/0244687 A1* | 8/2023 | Salim | G06F 16/256 |
| | | | 707/602 |
| 2023/0325377 A1* | 10/2023 | Eberlein | G06F 16/215 |
| | | | 707/690 |

OTHER PUBLICATIONS

Financial Stability Board (FSB), "Artificial intelligence and machine learning in financial services: Market developments and financial stability implications", Basel, Switzerland, Nov. 1, 2017, 45 pages. (Year: 2017).

* cited by examiner

CHANGE MANAGEMENT PROCESS FOR IDENTIFYING INCONSISTENCIES FOR IMPROVED PROCESSING EFFICIENCY

BACKGROUND

Field

This disclosure relates generally to a system and method for determining whether inconsistencies exist in an entity's shared databases and, more particularly, to a system and method for determining whether inconsistencies exist in an entity's shared databases using a machine learning model.

Discussion

A bank is a financial institution that is licensed to receive deposits from individuals and organizations and to make loans to those individuals and organizations or others. Banks may also perform other services such as wealth management, currency exchange, etc. Therefore, a bank may have thousands of customers and clients. Depending on the services that a bank provides, it may be classified as a retail bank, a commercial bank, an investment bank or some combination thereof. A retail bank typically provides services such as checking and savings accounts, loan and mortgage services, financing for automobiles, and short-term loans such as overdraft protection. A commercial bank typically provides credit services, cash management, commercial real estate services, employer services, trade finance, etc. An investment bank typically provides corporate clients with complex services and financial transactions such as underwriting and assisting with merger and acquisition activity.

A bank collects and stores a vast amount of data about and for its clients, such as client identifying information, for example, name, address, account types, account balances, credit score, income, etc. Different divisions of the bank, such as wealth management, commercial lending, residential lending, etc., may populate and change data in various databases independent of other divisions who may be populating and changing data in other databases. It is known to connect these databases in a common repository, sometimes referred to as an enterprise data lake (EDL), where they can be viewed by all authorized users. This allows bank personnel to see that certain data and information that has been collected so that new databases with redundant data are prevented from being generated when they aren't necessary. If a new database does need to be generated with the same or similar information for different clients and different bank divisions, then those databases can be identified with the same or similar name or title in the repository. Providing the data and information in a common repository also allows bank personnel to see if different divisions in the bank are paying outside services for the same or similar data and information. Improvements for managing data and information in these large repositories for these purposes can be provided to increase efficiencies.

SUMMARY

The following discussion discloses and describes a system and method for determining whether inconsistencies exist in an entity's shared databases using a machine learning model. The system includes a repository having a plurality of databases that store data and information in a format accessible to users, and a back-end server operatively coupled to the repository and being responsive to the data and information from all of the databases. The back-end server includes a processor for processing the data and information, a communications interface communicatively coupled to the processor, and a memory device storing data and executable code. The code causes the processor to collect data and information from the plurality of databases, store the collected data and information in the memory device, process the stored data and information through the machine learning model to determine whether inconsistencies in the data and information exist in the databases, receive a result from the machine learning model that determines whether inconsistencies in the data do exist in the databases, and transmit a communication on the interface identifying that inconsistencies in the data do exist in the databases, where remedial steps could then be taken to correct the inconsistencies.

Additional features of the disclosure will become apparent from the following description and appended claims, taken in conjunction with the accompanying drawings.

DETAILED DESCRIPTION OF THE EMBODIMENTS

Figure 1:
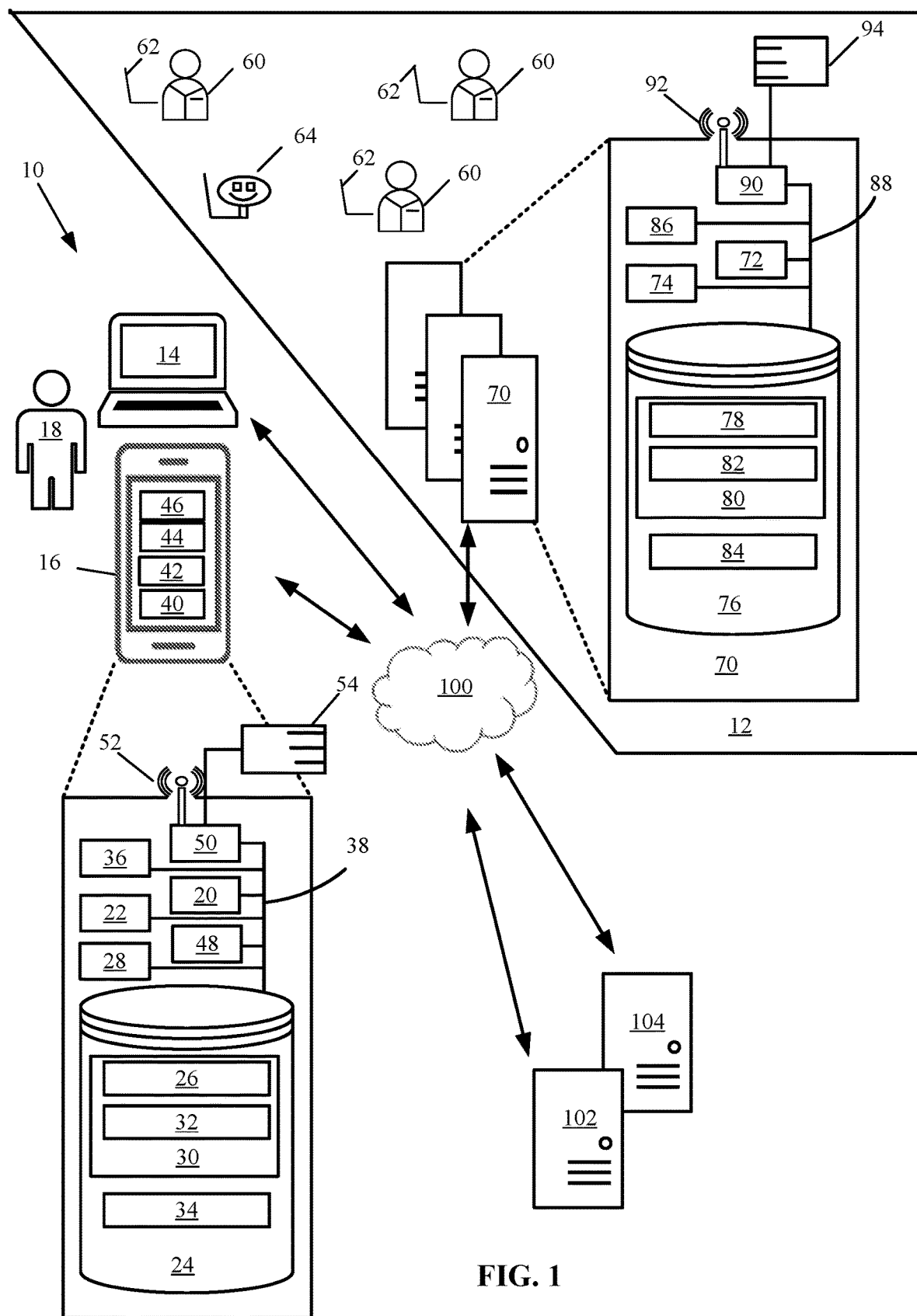
FIG. 1 illustrates a system and environment thereof by which a user benefits through use of services and products of an enterprise system.

The following discussion of the embodiments of the disclosure directed to a system and method for determining whether inconsistencies exist in an entity's shared databases using a machine learning model is merely exemplary in nature, and is in no way intended to limit the disclosure or its applications or uses.

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the disclosure and enable one of ordinary skill in the art to make, use and practice the disclosure.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present disclosure described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the disclosure. Therefore, it is to be understood that, within the scope of the included claims, the disclosure may be practiced other than as specifically described herein.

FIG. 1 illustrates a system 10, such as a banking system, and environment thereof by which a user 18 benefits through use of services and products of an enterprise system 12. The user 18 accesses services and products by use of one or more user devices, illustrated in separate examples as a computing device 14 and a mobile device 16, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 16 is the system 10 as having exemplary elements, the below descriptions of which apply as well to the computing device 14, which can be, as non-limiting examples, a desktop computer, a laptop computer or other user-accessible computing device.

Furthermore, the user device, referring to either or both of the computing device 14 and the mobile device 16, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 18 can be an individual, a group, or any entity in possession of or having access to the user device, referring to either or both of the computing device 14 and the mobile device 16, which may be personal or public items. Although the user 18 may be singly represented in some drawings, at least in some embodiments according to these descriptions the user 18 is one of many such that a market or community of users, consumers, customers, business entities, government entities, clubs, and groups of any size are all within the scope of these descriptions.

The user device, as illustrated with reference to the mobile device 16, includes components such as at least one of each of a processing device 20, and a memory device 22 for processing use, such as random access memory (RAM), and read-only memory (ROM). The illustrated mobile device 16 further includes a storage device 24 including at least one of a non-transitory storage medium, such as a microdrive, for long-term, intermediate-term, and short-term storage of computer-readable instructions 26 for execution by the processing device 20. For example, the instructions 26 can include instructions for an operating system and various applications or programs 30, of which the application 32 is represented as a particular example. The storage device 24 can store various other data items 34, which can include, as non-limiting examples, cached data, user files such as those for pictures, audio and/or video recordings, files downloaded or received from other devices, and other data items preferred by the user or required or related to any or all of the applications or programs 30.

The memory device 22 is operatively coupled to the processing device 20. As used herein, memory includes any computer readable medium to store data, code, or other information. The memory device 22 may include volatile memory, such as volatile RAM including a cache area for the temporary storage of data. The memory device 22 may also include non-volatile memory, which can be embedded and/or may be removable. The non-volatile memory can additionally or alternatively include an electrically erasable programmable read-only memory (EEPROM), flash memory or the like.

The memory device 22 and the storage device 24 can store any of a number of applications that comprise computer-executable instructions and code executed by the processing device 20 to implement the functions of the mobile device 16 described herein. For example, the memory device 22 may include such applications as a conventional web browser application and/or a mobile P2P payment system client application. These applications also typically provide a graphical user interface (GUI) on a display 40 that allows the user 18 to communicate with the mobile device 16, and, for example, a mobile banking system, and/or other devices or systems. In one embodiment, when the user 18 decides to enroll in a mobile banking program, the user 18 downloads or otherwise obtains the mobile banking system client application from a mobile banking system, for example, the enterprise system 12, or from a distinct application server. In other embodiments, the user 18 interacts with a mobile banking system via a web browser application in addition to, or instead of, the mobile P2P payment system client application.

The processing device 20, and other processors described herein, generally include circuitry for implementing communication and/or logic functions of the mobile device 16. For example, the processing device 20 may include a digital signal processor, a microprocessor, and various analog to digital converters, digital to analog converters, and/or other support circuits. Control and signal processing functions of the mobile device 16 are allocated between these devices according to their respective capabilities. The processing device 20 thus may also include the functionality to encode and interleave messages and data prior to modulation and transmission. The processing device 20 can additionally include an internal data modem. Further, the processing device 20 may include functionality to operate one or more software programs, which may be stored in the memory device 22, or in the storage device 24. For example, the processing device 20 may be capable of operating a connectivity program, such as a web browser application. The web browser application may then allow the mobile device 16 to transmit and receive web content, such as, for example, location-based content and/or other web page content, according to a wireless application protocol (WAP), hypertext transfer protocol (HTTP), and/or the like.

The memory device 22 and the storage device 24 can each also store any of a number of pieces of information, and data, used by the user device and the applications and devices that facilitate functions of the user device, or are in communication with the user device, to implement the functions described herein and others not expressly described. For example, the storage device 24 may include such data as user authentication information, etc.

The processing device 20, in various examples, can operatively perform calculations, can process instructions for execution and can manipulate information. The processing device 20 can execute machine-executable instructions stored in the storage device 24 and/or the memory device 22 to thereby perform methods and functions as described or implied herein, for example, by one or more corresponding flow charts expressly provided or implied as would be understood by one of ordinary skill in the art to which the subject matters of these descriptions pertain. The processing device 20 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 20, while in other embodiments methods and functions described herein include cloud-based computing in whole or in part such that the processing device 20 facilitates local operations including, as non-limiting examples, communication, data transfer, and user inputs and outputs such as receiving commands from and providing displays to the user.

The mobile device 16, as illustrated, includes an input and output system 36, referring to, including, or operatively coupled with, user input devices and user output devices, which are operatively coupled to the processing device 20. The user output devices include the display 40 (e.g., a liquid crystal display or the like), which can be, as a non-limiting example, a touch screen of the mobile device 16, which serves both as an output device, by providing graphical and text indicia and presentations for viewing by one or more of the users 18, and as an input device, by providing virtual buttons, selectable options, a virtual keyboard, and other indicia that, when touched, control the mobile device 16 by user action. The user output devices include a speaker 44 or other audio device. The user input devices, which allow the mobile device 16 to receive data and actions such as button manipulations and touches from a user such as the user 18, may include any of a number of devices allowing the mobile device 16 to receive data from a user, such as a keypad, keyboard, touch-screen, touchpad, microphone 42, mouse, joystick, other pointer device, button, soft key, and/or other input device(s). The user interface may also include a camera 46, such as a digital camera.

Further non-limiting examples include one or more of each, any and all of a wireless or wired keyboard, a mouse, a touchpad, a button, a switch, a light, an LED, a buzzer, a bell, a printer and/or other user input devices and output devices for use by or communication with the user 18 in accessing, using, and controlling, in whole or in part, the user device, referring to either or both of the computing device 14 and the mobile device 16. Inputs by one or more of the users 18 can thus be made via voice, text or graphical indicia selections. For example, such inputs in some examples correspond to user-side actions and communications seeking services and products of the enterprise system 12, and at least some outputs in such examples correspond to data representing enterprise-side actions and communications in two-way communications between the user 18 and the enterprise system 12.

The mobile device 16 may also include a positioning system device 48, which can be, for example, a global positioning system (GPS) device configured to be used by a positioning system to determine a location of the mobile device 16. For example, the positioning system device 48 may include a GPS transceiver. In some embodiments, the positioning system device 48 includes an antenna, transmitter, and receiver. For example, in one embodiment, triangulation of cellular signals may be used to identify the approximate location of the mobile device 16. In other embodiments, the positioning device 48 includes a proximity sensor or transmitter, such as an RFID tag, that can sense or be sensed by devices known to be located proximate a merchant or other location to determine that the consumer mobile device 16 is located proximate these known devices.

In the illustrated example, a system intraconnect 38, connects, for example electrically, the various described, illustrated, and implied components of the mobile device 16. The intraconnect 38, in various non-limiting examples, can include or represent, a system bus, a high-speed interface connecting the processing device 20 to the memory device 22, individual electrical connections among the components, and electrical conductive traces on a motherboard common to some or all of the above-described components of the user device. As discussed herein, the system intraconnect 38 may operatively couple various components with one another, or in other words, electrically connects those components, either directly or indirectly—by way of intermediate component(s)—with one another.

The user device, referring to either or both of the computing device 14 and the mobile device 16, with particular reference to the mobile device 16 for illustration purposes, includes a communication interface 50, by which the mobile device 16 communicates and conducts transactions with other devices and systems. The communication interface 50 may include digital signal processing circuitry and may provide two-way communications and data exchanges, for example, wirelessly via wireless communication device 52, and for an additional or alternative example, via wired or docked communication by mechanical electrically conductive connector 54. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 52, which can be or include a radio-frequency transceiver, a Bluetooth device, Wi-Fi device, a near-field communication device, and other transceivers. In addition, GPS may be included for navigation and location-related data exchanges, ingoing and/or outgoing. Communications may also or alternatively be conducted via the connector 54 for wired connections such by USB, Ethernet, and other physically connected modes of data transfer.

The processing device 20 is configured to use the communication interface 50 as, for example, a network interface to communicate with one or more other devices on a network. In this regard, the communication interface 50 utilizes the wireless communication device 52 as an antenna operatively coupled to a transmitter and a receiver (together a "transceiver") included with the communication interface 50. The processing device 20 is configured to provide signals to and receive signals from the transmitter and receiver, respectively. The signals may include signaling information in accordance with the air interface standard of the applicable cellular system of a wireless telephone network. In this regard, the mobile device 16 may be configured to operate with one or more air interface standards, communication protocols, modulation types, and access types. By way of illustration, the mobile device 16 may be configured to operate in accordance with any of a number of first, second, third, fourth or fifth-generation communication protocols and/or the like. For example, the mobile device 16 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as universal mobile telecommunications System (UMTS), CDMA2000, wideband CDMA (WCDMA) and/or time division-synchronous CDMA (TD-SCDMA), with fourth-generation (4G) wireless communication protocols such as long-term evolution (LTE), fifth-generation (5G) wireless communication protocols, Bluetooth low energy (BLE) communication protocols such as Bluetooth 5.0, ultra-wideband (UWB) communication protocols, and/or the like. The mobile device 16 may also be configured to operate in accordance with non-cellular communication mechanisms, such as via a wireless local area network (WLAN) or other communication/data networks.

The communication interface 50 may also include a payment network interface. The payment network interface may include software, such as encryption software, and hardware, such as a modem, for communicating information to and/or from one or more devices on a network. For example, the mobile device 16 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 16 further includes a power source 28, such as a battery, for powering various circuits and other devices that are used to operate the mobile device 16. Embodiments of the mobile device 16 may also include a clock or other timer configured to determine and, in some cases, communicate actual or relative time to the processing device 20 or one or more other devices. For a further example, the clock may facilitate timestamping transmissions, receptions, and other data for security, authentication, logging, polling, data expiry and forensic purposes.

The system 10 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 12 can offer any number or type of services and products to one or more of the users 18. In some examples, the enterprise system 12 offers products, and in some examples, the enterprise system 12 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests and credit scores.

To provide access to, or information regarding, some or all the services and products of the enterprise system 12, automated assistance may be provided by the enterprise system 12. For example, automated access to user accounts and replies to inquiries may be provided by enterprise-side automated voice, text, and graphical display communications and interactions. In at least some examples, any number of human agents 60, can be employed, utilized, authorized or referred by the enterprise system 12. Such human agents 60 can be, as non-limiting examples, point of sale or point of service (POS) representatives, online customer service assistants available to the users 18, advisors, managers, sales team members, and referral agents ready to route user requests and communications to preferred or particular other agents, human or virtual.

The human agents 60 may utilize agent devices 62 to serve users in their interactions to communicate and take action. The agent devices 62 can be, as non-limiting examples, computing devices, kiosks, terminals, smart devices such as phones, and devices and tools at customer service counters and windows at POS locations. In at least one example, the diagrammatic representation of the components of the mobile device 16 in FIG. 1 applies as well to one or both of the computing device 14 and the agent devices 62.

The agent devices 62 individually or collectively include input devices and output devices, including, as non-limiting examples, a touch screen, which serves both as an output device by providing graphical and text indicia and presentations for viewing by one or more of the agents 60, and as an input device by providing virtual buttons, selectable options, a virtual keyboard, and other indicia that, when touched or activated, control or prompt the agent device 62 by action of the attendant agent 60. Further non-limiting examples include, one or more of each, any, and all of a keyboard, a mouse, a touchpad, a joystick, a button, a switch, a light, an LED, a microphone serving as input device for example for voice input by the human agent 60, a speaker serving as an output device, a camera serving as an input device, a buzzer, a bell, a printer and/or other user input devices and output devices for use by or communication with the human agent 60 in accessing, using, and controlling, in whole or in part, the agent device 62.

Inputs by one or more of the human agents 60 can thus be made via voice, text or graphical indicia selections. For example, some inputs received by the agent device 62 in some examples correspond to, control, or prompt enterprise-side actions and communications offering services and products of the enterprise system 12, information thereof, or access thereto. At least some outputs by the agent device 62 in some examples correspond to, or are prompted by, user-side actions and communications in two-way communications between the user 18 and an enterprise-side human agent 60.

From a user perspective experience, an interaction in some examples within the scope of these descriptions begins with direct or first access to one or more of the human agents 60 in person, by phone or online for example via a chat session or website function or feature. In other examples, a user is first assisted by a virtual agent 64 of the enterprise system 12, which may satisfy user requests or prompts by voice, text or online functions, and may refer users to one or more of the human agents 60 once preliminary determinations or conditions are made or met.

The enterprise system 12 includes a computing system 70 having various components, such as a processing device 72 and a memory device 74 for processing use, such as random access memory (RAM) and read-only memory (ROM). The computing system 70 further includes a storage device 76 having at least one non-transitory storage medium, such as a microdrive, for long-term, intermediate-term, and short-term storage of computer-readable instructions 78 for execution by the processing device 72. For example, the instructions 78 can include instructions for an operating system and various applications or programs 80, of which an application 82 is represented as a particular example. The storage device 76 can store various other data 84, which can include, as non-limiting examples, cached data, and files such as those for user accounts, user profiles, account balances, and transaction histories, files downloaded or received from other devices, and other data items preferred by the user or required or related to any or all of the applications or programs 80.

The computing system 70, in the illustrated example, also includes an input/output system 86, referring to, including, or operatively coupled with input devices and output devices such as, in a non-limiting example, agent devices 62, which have both input and output capabilities.

In the illustrated example, a system intraconnect 88 electrically connects the various above-described components of the computing system 70. In some cases, the intraconnect 88 operatively couples components to one another, which indicates that the components may be directly or indirectly connected, such as by way of one or more intermediate components. The intraconnect 88, in various non-limiting examples, can include or represent, a system bus, a high-speed interface connecting the processing device 72 to the memory device 74, individual electrical connections among the components, and electrical conductive traces on a motherboard common to some or all of the above-described components of the user device.

The computing system 70 includes a communication interface 90 by which the computing system 70 communicates and conducts transactions with other devices and systems. The communication interface 90 may include digital signal processing circuitry and may provide two-way communications and data exchanges, for example wirelessly via wireless device 92, and for an additional or alternative example, via wired or docked communication by mechanical electrically conductive connector 94. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 92, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 94 for wired connections such as by USB, Ethernet, and other physically connected modes of data transfer.

The processing device 72, in various examples, can operatively perform calculations, can process instructions for execution, and can manipulate information. The processing device 72 can execute machine-executable instructions stored in the storage device 76 and/or the memory device 74 to thereby perform methods and functions as described or implied herein, for example by one or more corresponding flow charts expressly provided or implied as would be understood by one of ordinary skill in the art to which the subjects matters of these descriptions pertain. The processing device 72 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 70, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 16 and the computing device 14, the agent devices 62 and the computing system 70, which may be one or any number centrally located or distributed, are in communication through one or more networks, referenced as system 10 in FIG. 1.

The network 100 provides wireless or wired communications among the components of the network 100 and the environment thereof, including other devices local or remote to those illustrated, such as additional mobile devices, servers, and other devices communicatively coupled to the network 100, including those not illustrated in FIG. 1. The network 100 is singly depicted for illustrative convenience, but may include more than one network without departing from the scope of these descriptions. In some embodiments, the network 100 may be or provide one or more cloud-based services or operations. The network 100 may be or include an enterprise or secured network, or may be implemented, at least in part, through one or more connections to the Internet. A portion of the network 100 may be a virtual private network (VPN) or an Intranet. The network 100 can include wired and wireless links, including, as non-limiting examples, 802.11a/b/g/n/ac, 802.20, WiMax, LTE, and/or any other wireless link. The network 100 may include any internal or external network, networks, sub-network, and combinations of such operable to implement communications between various computing components within and beyond the network 100. The network 100 may communicate, for example, internet protocol (IP) packets, frame relay frames, asynchronous transfer mode (ATM) cells, voice, video, data, and other suitable information between network addresses. The network 100 may also include one or more local area networks (LANs), radio access networks (RANs), metropolitan area networks (MANs), wide area networks (WANs), all or a portion of the internet and/or any other communication system or systems at one or more locations.

Two external systems 102 and 104 are illustrated in FIG. 1 and representing any number and variety of data sources, users, consumers, customers, business entities, banking systems, government entities, clubs, and groups of any size are all within the scope of the descriptions. In at least one example, the external systems 102 and 104 represent automatic teller machines (ATMs) utilized by the enterprise system 12 in serving the users 18. In another example, the external systems 102 and 104 represent payment clearinghouse or payment rail systems for processing payment transactions, and in another example, the external systems 102 and 104 represent third party systems such as merchant systems configured to interact with the user device 16 during transactions and also configured to interact with the enterprise system 12 in back-end transactions clearing processes.

In certain embodiments, one or more of the systems such as the user device 16, the enterprise system 12, and/or the external systems 102 and 104 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms and modules are used at least in part in implementing artificial intelligence (AI) functions, systems and methods.

Artificial Intelligence and/or machine learning programs may be associated with or conducted by one or more processors, memory devices, and/or storage devices of a computing system or device. It should be appreciated that the artificial intelligence algorithm or program may be incorporated within the existing system architecture or be configured as a standalone modular component, controller, or the like communicatively coupled to the system. An artificial intelligence program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

The artificial intelligence systems and structures discussed herein may employ deep learning. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Figure 2:
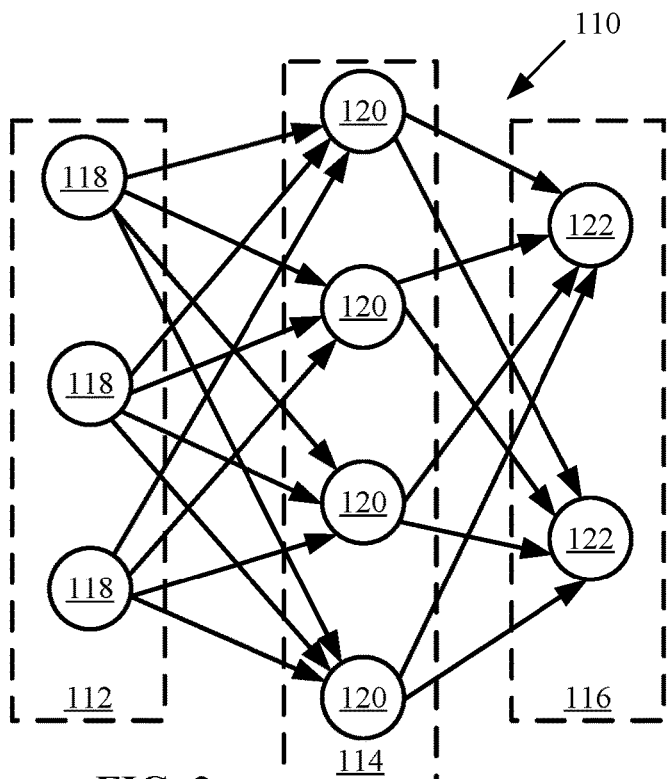
FIG. 2 is a diagram of a feedforward network.

FIG. 2 illustrates a feedforward neural network 110 that includes a hidden layer 114 between an input layer 112 and an output layer 116. The input layer 112, having nodes commonly referenced in FIG. 2 as input nodes 118 for convenience, communicates input data, variables, matrices, or the like to the hidden layer 114, having nodes 120. The hidden layer 114 generates a representation and/or transformation of the input data into a form that is suitable for generating output data. Adjacent layers of the neural network 110 are connected at the edges of the nodes of the respective layers, but nodes within a layer typically are not separated by an edge. In at least one embodiment of such a feedforward neural network, data is communicated to the nodes 118 of the input layer 112, which then communicates the data to the hidden layer 114. The hidden layer 114 may be configured to determine the state of the nodes in the respective layers and assign weight coefficients or parameters of the nodes based on the edges separating each of the layers, such as an activation function implemented between the input data communicated from the input layer 112 and the output data communicated to nodes 122 of the output layer 116. It should be appreciated that the form of the output from the neural network may generally depend on the type of model represented by the algorithm. Although the feedforward neural network 110 expressly includes a single hidden layer, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained, for example, utilizing a training data set, prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount, such as a value between −1 and 1, may be used to modify the previous coefficient, e.g., a propagated value. The machine learning algorithm may be considered sufficiently trained when the associated error amount for the output data is less than the predetermined, acceptable level, for example, each data point within the output layer includes an error amount less than the predetermined, acceptable level. Thus, the parameters determined from the training process can be utilized with new input data to categorize, classify, and/or predict other values based on the new input data.

An additional or alternative type of neural network suitable for use in a machine learning program and/or module is a convolutional neural network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 3:
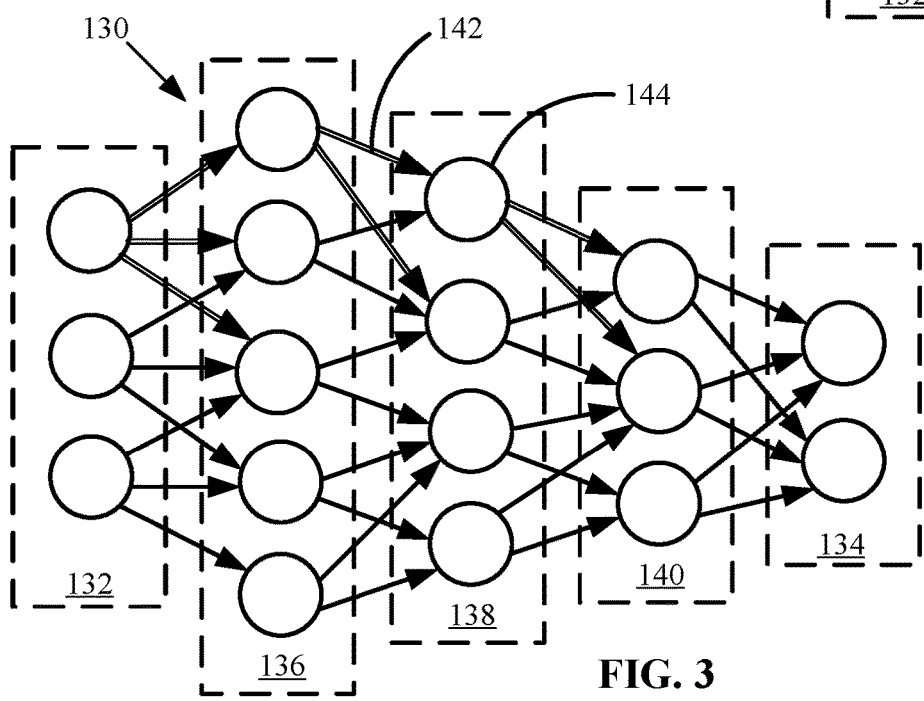
FIG. 3 is a diagram of a convolutional neural network (CNN)

FIG. 3 is an illustration of an exemplary CNN 130 that includes an input layer 132 and an output layer 134. However, where the single hidden layer 114 is provided in the network 110, multiple consecutive hidden layers 136, 138 and 140 are provided in the CNN 130. Edge neurons 142 represented by white-filled arrows highlight that hidden layer nodes 144 can be connected locally, such that not all of the nodes of succeeding layers are connected by neurons.

Figure 4:
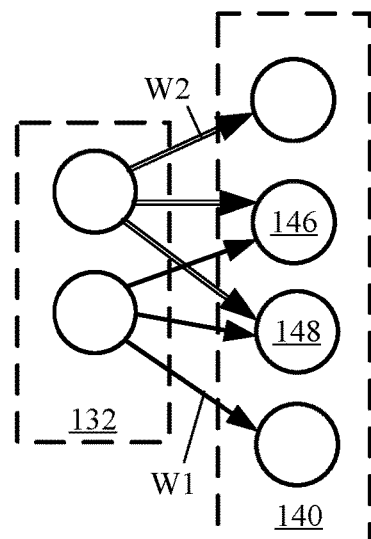
FIG. 4 is a diagram of a portion of the CNN shown in FIG. 3 illustrating assigned weights at connections or neurons.

FIG. 4 shows a portion of the CNN 130, specifically portions of the input layer 132 and the first hidden layer 136, and illustrates that connections can be weighted. In the illustrated example, labels W1 and W2 refer to respective assigned weights for the referenced connections. The two hidden nodes 146 and 148 share the same set of weights W1 and W2 when connecting to two local patches.

Figure 5:
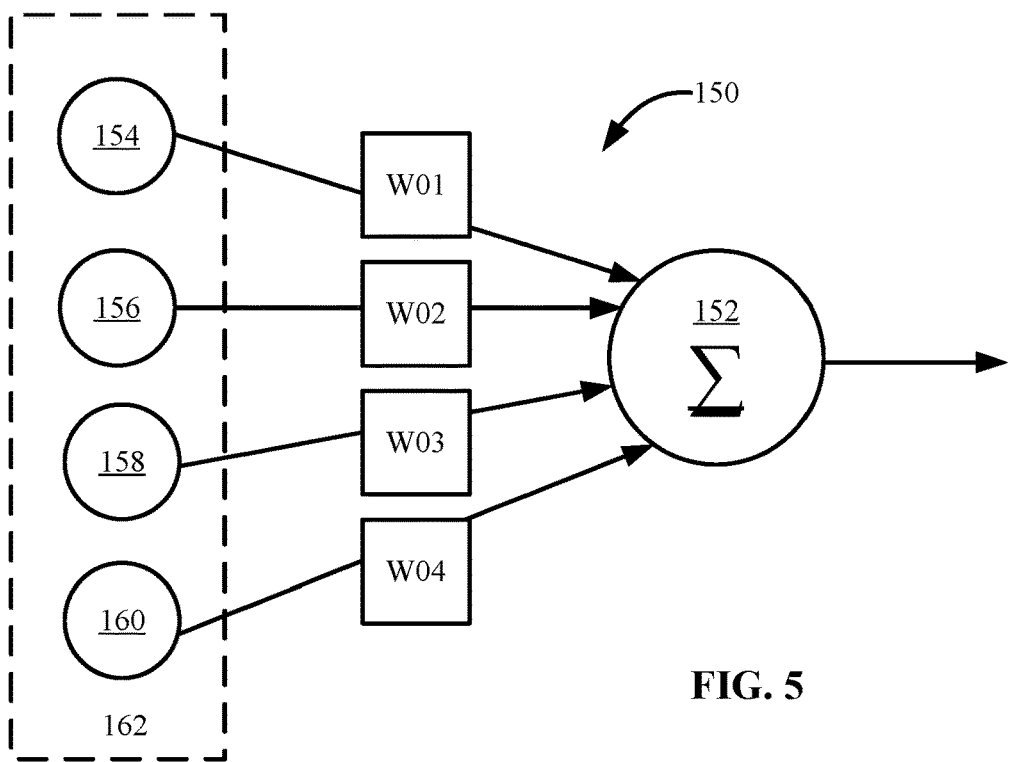
FIG. 5 is a diagram representing an exemplary weighted sum computation in a node in an artificial neural network.

A weight defines the impact a node in any given layer has on computations by a connected node in the next layer. FIG. 5 shows a network 150 including a node 152 in a hidden layer. The node 152 is connected to several nodes in the previous layer representing inputs to the node 152. Input nodes 154, 156, 158 and 160 in an input layer 162 are each assigned a respective weight W01, W02, W03, and W04 in the computation at the node 152, which in this example is a weighted sum.

An additional or alternative type of feedforward neural network suitable for use in the machine learning program and/or module is a recurrent neural network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 6:
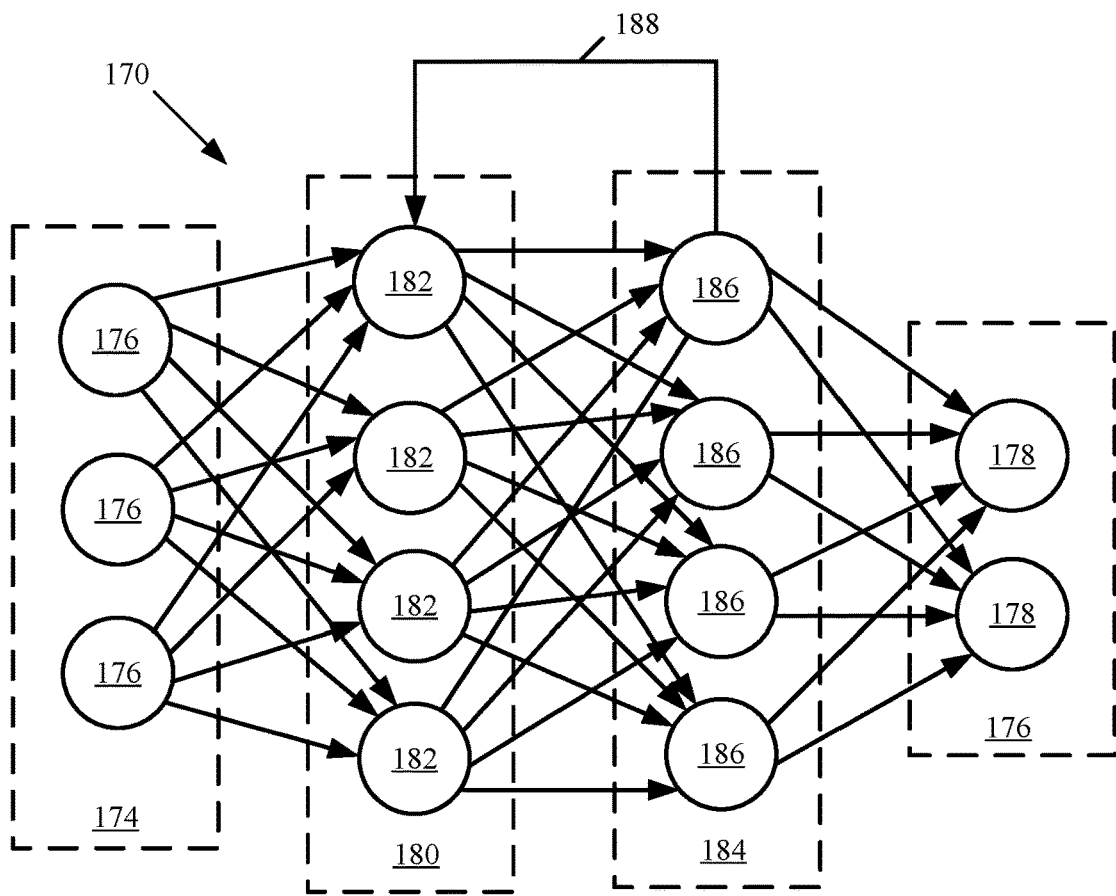
FIG. 6 is a diagram of a recurrent neural network (RNN) utilized in machine learning.

FIG. 6 illustrates an RNN 170 that includes an input layer 172 with nodes 174, an output layer 176 with nodes 178, and multiple consecutive hidden layers 180 and 182 with nodes 184 and nodes 186, respectively. The RNN 170 also includes a feedback connector 188 configured to communicate parameter data from at least one of the nodes 186 in the second hidden layer 184 to at least one of the nodes 182 in the first hidden layer 184. It should be appreciated that two or more and up to all of the nodes of a subsequent layer may provide or communicate a parameter or other data to a previous layer of the RNN 170. Moreover and in some embodiments, the RNN 170 may include multiple feedback connectors, such as connectors suitable to communicatively couple pairs of nodes and/or connector systems configured to provide communication between three or more nodes. Additionally or alternatively, the feedback connector 188 may communicatively couple two or more nodes having at least one hidden layer between them, i.e., nodes of non-sequential layers of the RNN 170.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 7:
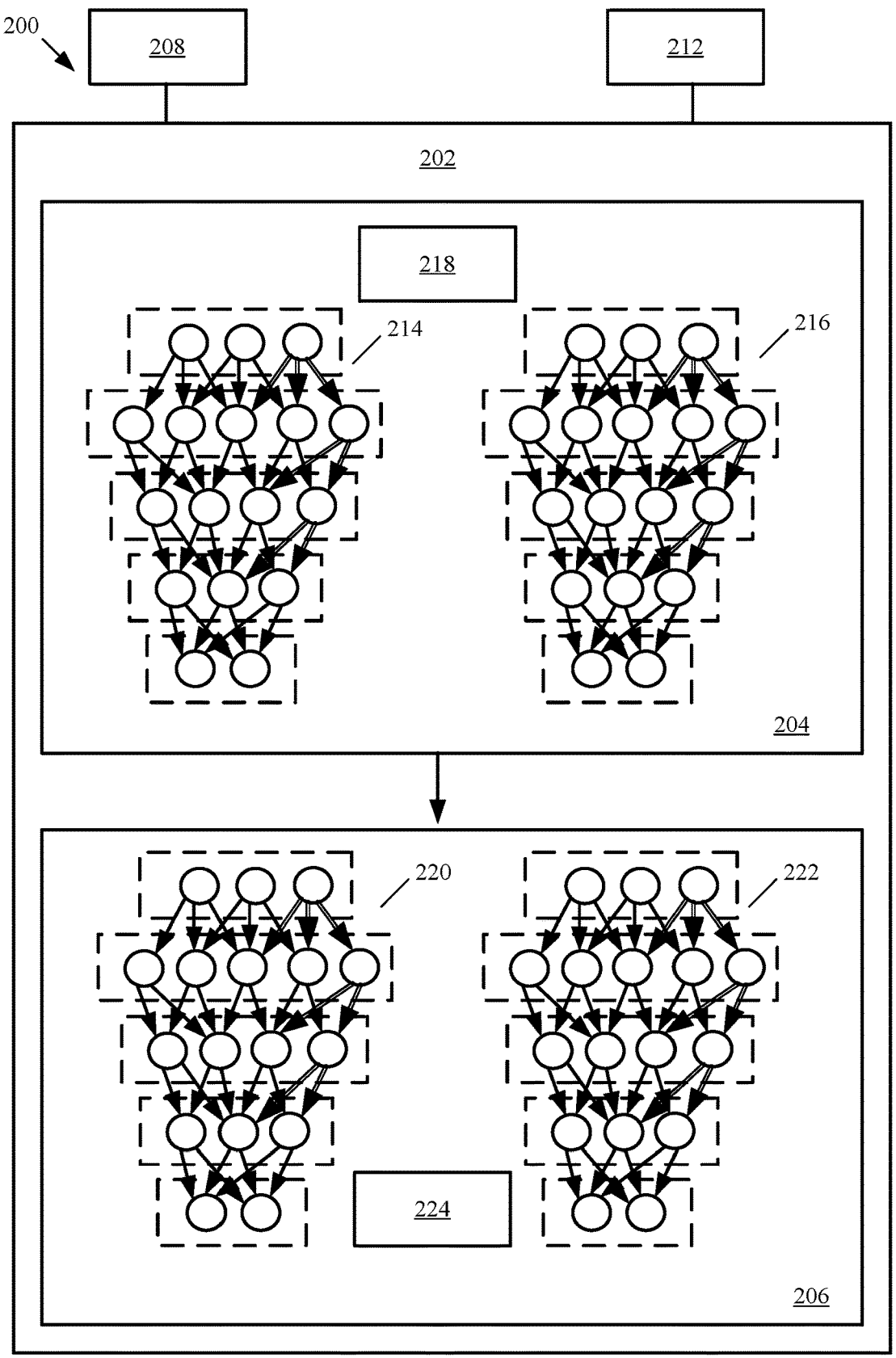
FIG. 7 is a schematic logic diagram of an artificial intelligence processor operating an artificial intelligence program.

FIG. 7 is a block diagram of an artificial intelligence programming system 200 including an AI processor 202, such as a dedicated processing device, that operates an artificial intelligence program, where the processor 202 includes a front-end sub-processor 204 and a back-end sub-processor 206. The algorithms associated with the front-end sub-processor 204 and the back-end sub-processor 206 may be stored in an associated memory device and/or storage device, such as memory device 208 communicatively coupled to the AI processor 202, as shown. Additionally, the system 200 may include a memory 212 storing one or more instructions necessary for operating the AI program. In this embodiment, the sub-processor 204 includes neural networks 214 and 216 operating an AI algorithm 218, such as feature recognition, and the sub-processor 206 includes neural networks 220 and 222 operating an AI algorithm 224 to perform an operation on the data set communicated directly or indirectly to the sub-processor 206.

The system 200 may provide statistical models or machine learning programs such as decision tree learning, associate rule learning, recurrent artificial neural networks, support vector machines, and the like. In various embodiments, the sub-processor 204 may be configured to include built in training and inference logic or suitable software to train the neural network prior to use, for example, machine learning logic including, but not limited to, image recognition, mapping and localization, autonomous navigation, speech synthesis, document imaging, or language translation. For example, the sub-processor 204 may be used for image recognition, input categorization, and/or support vector training. In various embodiments, the sub-processor 206 may be configured to implement input and/or model classification, speech recognition, translation, and the like.

For instance and in some embodiments, the system 200 may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set. For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the system 200 may be trained using a semi-supervised learning process in which some but not all of the output data is known, e.g., a mix of labeled and unlabeled data having the same distribution.

In some embodiments, the system 200 may include an index of basic operations, subroutines, and the like (primitives) typically implemented by AI and/or machine learning algorithms. Thus, the system 200 may be configured to utilize the primitives of the processor 202 to perform some or all of the calculations required by the system 200. Primitives suitable for inclusion in the processor 202 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., logistic regression (LR), Naive-Bayes, random forest (RF), matrix factorization, and support vector machines) in addition to, or as an alternative to, one or more neural networks, as described herein.

Figure 8:
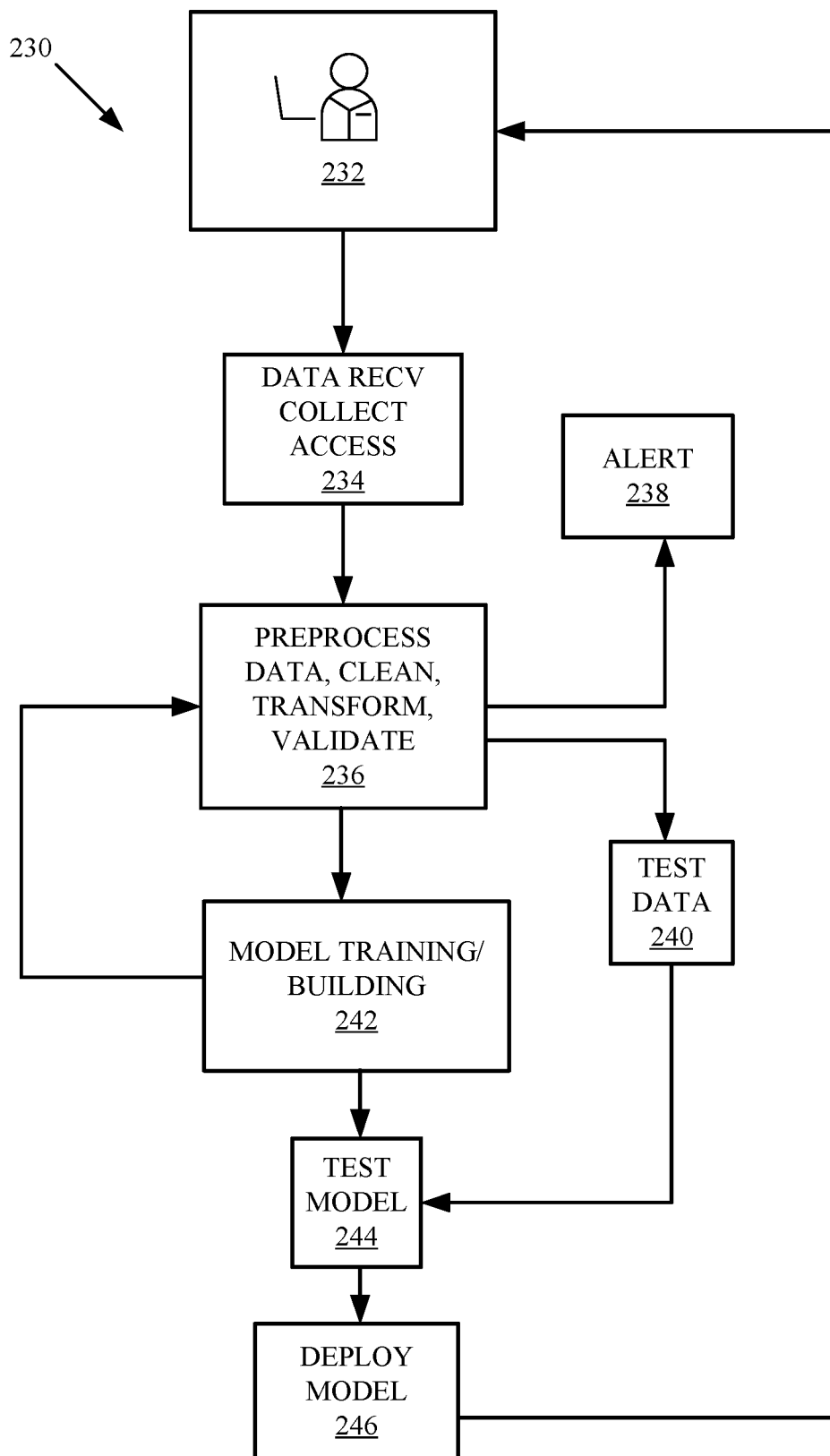
FIG. 8 is a flow chart showing a method for model development and deployment by machine learning.

FIG. 8 is a flow chart diagram 230 showing an exemplary method for model development and deployment by machine learning. The method represents at least one example of a machine learning workflow in which steps are implemented in a machine learning project. At box 232, a user authorizes, requests, manages, or initiates the machine-learning workflow. This may represent a user such as human agent, or customer, requesting machine-learning assistance or AI functionality to simulate intelligent behavior, such as a virtual agent, or other machine-assisted or computerized tasks that may, for example, entail visual perception, speech recognition, decision-making, translation, forecasting, predictive modelling, and/or suggestions as non-limiting examples. In a first iteration from the user perspective, the box 232 can represent a starting point. However, with regard to continuing or improving an ongoing machine learning workflow, the box 232 can represent an opportunity for further user input or oversight via a feedback loop.

At box 234, data is received, collected, accessed or otherwise acquired and entered as can be termed data ingestion. At box 236, data ingested from the box 234 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing is updated with newly ingested data, an updated model will be generated. The process at the box 236 can include data validation, which focuses on confirming that the statistics of the ingested data are as expected, such as that data values are within expected numerical ranges, that data sets are within any expected or required categories, and that data comply with any needed distributions such as within those categories. The process can proceed to box 238 to automatically alert the initiating user, other human or virtual agents, and/or other systems, if any anomalies are detected in the data, thereby pausing or terminating the process flow until corrective action is taken.

At box 240, training test data, such as a target variable value, is inserted into an iterative training and testing loop. At box 242, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison at box 244, where the model is tested. Subsequent iterations of the model training at the box 242 may be conducted with updated weights in the calculations.

When compliance and/or success in the model testing at the box 244 is achieved, the process proceeds to box 246, where model deployment is triggered. The model may be utilized in AI functions and programming, for example, to simulate intelligent behavior, to perform machine-assisted or computerized tasks, of which visual perception, speech recognition, decision-making, translation, forecasting, predictive modelling, and/or automated suggestion generation serve as non-limiting examples.

Figure 9:
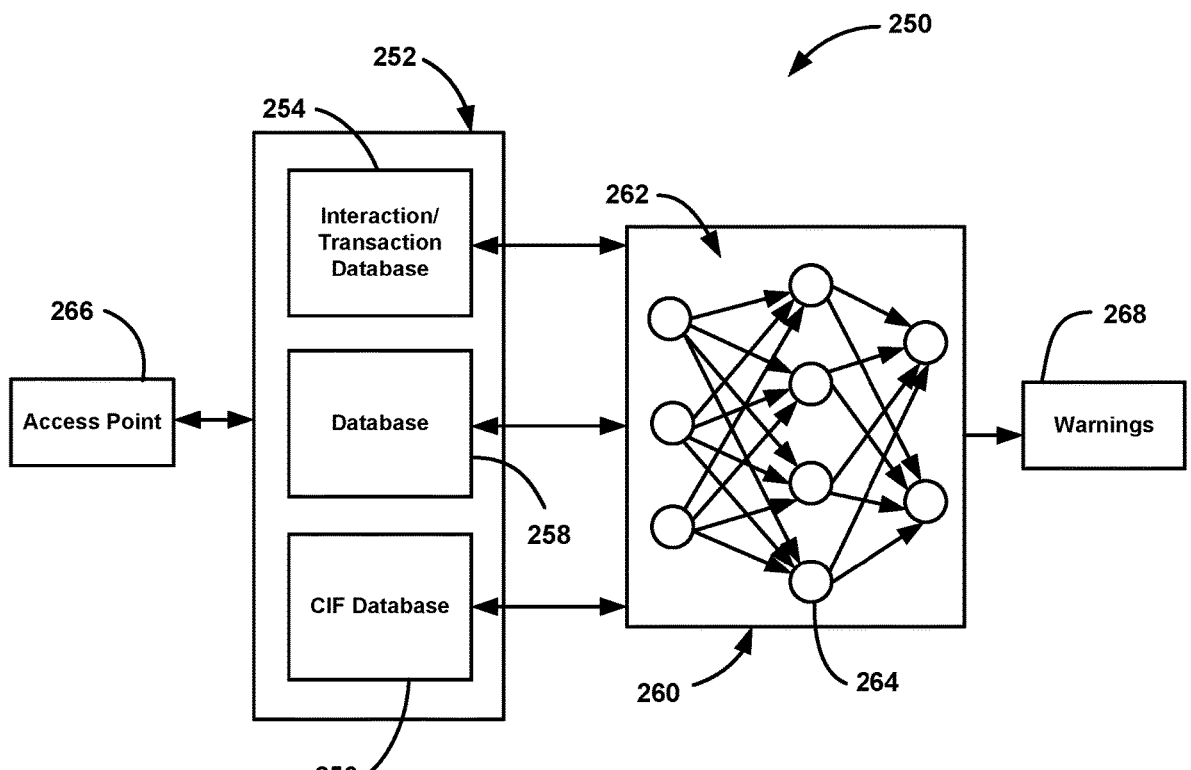
FIG. 9 is a block diagram of a change management system that automatically updates a companywide and company accessible database.

FIG. 9 is a block diagram of a change management system 250 that automatically updates companywide and company accessible databases as data and information is added or changed, where the system 250 may be part of the enterprise system 12 and may employ some or any of the devices and processes discussed above. The system 250 includes an EDL sub-system 252 having a plurality of sources of client data and information. One of those sources is a client interaction and transaction source 254 that stores information and data in a useable format obtained for each of the interactions and transactions between all of the banks clients and the bank over all of the banking channels. As used herein, an interaction or transaction is any event or action that occurs between a client of the bank and the bank or its representatives through any system or device, and a banking channel is a specific connection point for that interaction or transaction, such as a website, mobile applications, branch banking, online banking, customer service center calls, etc. Another one of those sources is a customer information file (CIF) database 256, which is a client master database that stores identifying data and information, such as name, address, account types, account balances, social security number, credit score, etc., for all of the clients of the bank. Database 258 is intended to represent all other sources of stored data and information that the bank may choose to be available and accessible by some or all of the various divisions and organizations associated with the bank. Box 266 is an access point to the sub-system 252 that allows authorized users and personnel to access the various databases in the sub-system 252 using a suitable search engine and add, update or change the data and information stored therein. The data in the various databases would likely be stored as metadata so that it is encoded and the actual data is not visible. Thus, if an authorized user wants to know if certain data is available about a certain client, then that user can access the EDL sub-system 252 to see if that data is available, and if not, input it into the appropriate database in the EDL sub-system 252, where it will then be available to other authorized users who may want the information.

As the various databases in the sub-system 252 are being updated and changed, those changes are provided to a processor 260 that employs a machine learning model to identify where that information and data may be stored in other databases in the sub-system 252, and updates those databases accordingly. The processor 260 analyzes and filters the data so that tables and files in the particular databases that have the same data are identified with, for example, the same name so that the various tables and files are reconciled with each other across the EDL sub-system 252. The processor 260 can look at the data in the various tables and files and determine if the name of the table or file is consistent with the data. Thus, the processor 260 may perform a change management process where tables and foes are renamed and updated as the data contained therein changes. The processor 260 could perform some type of encoding scheme so that the data is only visible as metadata. This allows authorized users at the access point 266 to see when a database that they may be interested in has been updated. Therefore, the users can obtain data that they may need without having to obtain that data from another source to effectively have the data available to all who need it. For example, if one division of the bank needs a credit score for a client or potential client for authorization for a loan, that credit score may be available in the EDL sub-system 252 from another division, and thus the division seeking the credit score does not have to pay an outside entity for that information.

As discussed above, machine learning is a type of artificial intelligence that allows various software applications to become more accurate at predicting outcomes without being explicitly programmed to do so, where the machine learning algorithms use historical data as an input to predict new output values. The machine learning processors and algorithms used for this purpose can employ some or all of the various neural network types discussed above, such as CNNs and RNNs. Thus, the processor 260 may include, among other devices and components, one or more neural networks 262 having trained and weighted nodes 264. The nodes 264 in the neural network 262 would be weighted and trained for the database updating process discussed herein, where the neural network 262 would learn more about accurately updating the databases as more data is processed. The processor 260 could output a flag or some type of warning at box 268 to the appropriate personnel if the analysis of the data by the processor 260 indicates a problem or issue, where remedial steps could then be taken to correct or address the problem.

The machine learning model executed in the processor 260 can also be implemented to address one, some or all of various issues. For example, the processor 260 could filter and analyze the changes and updating of the data and information from the EDL sub-system 252 to determine whether the bank is paying or acquiring the same data and information, for example, client credit scores, multiple times from the same outside source or different outside sources, which can then be addressed and corrected in a cost saving manner. The processor 260 could also filter and analyze the changes and updating of the data and information from the EDL sub-system 252 to identify whether data is being shared across the company or bank that is contractually required to be kept secret or not be shared with multiple divisions in the company, which can then be corrected. The processor 260 could also filter and analyze the changes and updating of the data and information from the EDL sub-system 252 to make sure that they do not potentially violate regulatory requirements necessary for proper regulatory reporting and other regulatory issues. Further, the processor 260 could also filter and analyze the changes and updating of the data and information from the EDL sub-system 252 to look for financial misstatements and errors and/or other data inconsistencies. The remedial steps to correct the problem could include removing the operations that provided the redundancy in acquiring the same data, removing the confidential information from the databases, making sure that the regulatory requirements are being met and correcting the inconsistencies.

Figure 10:
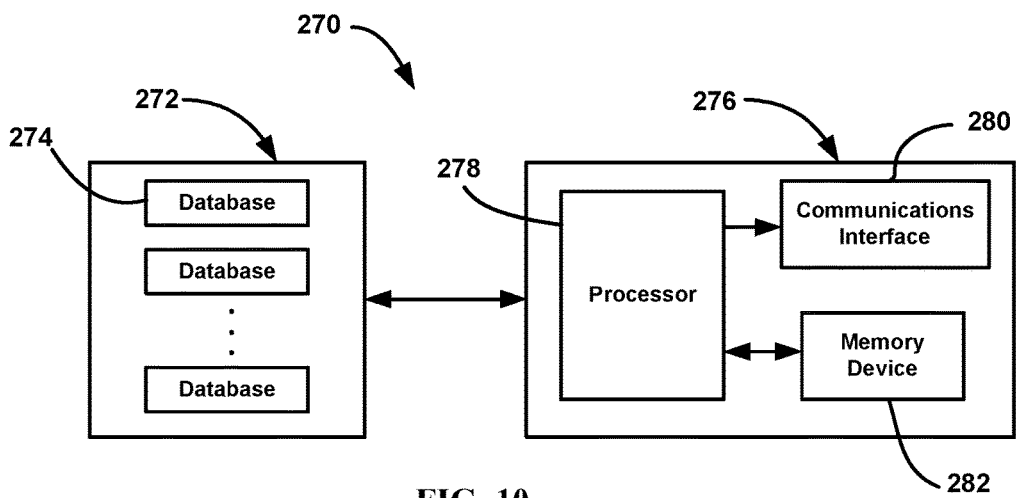
FIG. 10 is a block diagram of a change management architecture including a back-end server.

FIG. 10 is a block diagram of a change management architecture 270 that could identify these and/or other issues and could be part of the enterprise system 12 and may employ some or any of the devices and processes discussed above. The architecture 270 includes a repository 272 having a plurality of databases 274 that store data and information in a format accessible to users, and a back-end server 276 operatively coupled to the repository 272 and being responsive to the data and information from all of the databases 274. The back-end server 276 includes a processor 278 for processing the data and information, a communications interface 280 communicatively coupled to the processor 278 and a memory device 282 for storing data and executable code. The executable code causes the processor 278 to collect data and information from the databases 274, store the collected data and information in the memory device 282, process the stored data and information through a machine learning model, receive a result from the machine learning model, and transmit a communication identifying the result on the interface 280, which may include a warning that there is some problem that needs to be addressed. Suitable remedial steps could then be taken to correct or address the problem.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for determining whether inconsistencies exist in an entity's shared databases using a machine learning model, said system comprising:
 a repository including a plurality of databases that store data and information in a format accessible to users, said plurality of databases being shared by multiple users across multiple divisions and organizations associated the entity;
 a back-end server operatively coupled to the repository and being responsive to the data and information from all of the databases, said back-end server including:
 at least one processor for processing the data and information;
 a communications interface communicatively coupled to the at least one processor; and
 a memory device storing data and executable code that, when executed, causes the at least one processor to:
  collect data and information from the plurality of databases;
  store the collected data and information in the memory device;
  process the stored data and information through the machine learning model to determine whether inconsistencies in the data and information exist in and across the plurality of databases including determining if a name of a database is consistent with the data in the database, wherein the machine learning model uses at least one neural network having nodes that have been trained to determine whether inconsistencies in the data and information exist in the plurality of databases,
 wherein the machine learning model trains the nodes in the at least one neural network by unsupervised learning and by training nodes in a neural network simulation model that is a simulation of the at least one neural network, said neural network simulation model employing training data to train the nodes in the neural network simulation model for determining whether inconsistencies in the data and information exist in the plurality of databases and exist in a target variable, said target variable being a variable in the neural network simulation model,
 wherein the unsupervised learning of the at least one neural network configures the at least one neural network to generate a self-organizing map, to reduce the dimensionally of an input data set, and to perform outlier/anomaly determinations to identify data points in the input data set that fall outside of a normal pattern of the data,
 wherein training the nodes in the neural network simulation model uses an iterative training and testing loop that incorporates weights associated with the nodes in the neural network simulation model and iterative calculations that are tested, compared to the target variable and updated in subsequent iterative calculations to improve predictability of the target variable,
 wherein training the nodes in the neural network simulation model includes ingesting incoming data by cleaning and transforming new training data into a format that the neural network simulation model can digest,
 wherein as newly trained neural network simulation models are generated from new data, preprocessing steps are tied to the newly trained neural network simulation model, and when the preprocessing is updated with newly ingested data, an updated neural network simulation model is generated;
 receive a result from the machine learning model of whether inconsistencies in the data and information do exist in the databases;
 transmit a communication message through the interface identifying that inconsistencies in the data and information do exist in the databases, where remedial steps could then be taken to remove the inconsistencies from the databases;
 rename the databases if the type of data contained therein changes;
 analyze and filter the data so that the databases that have the same data are identified and reconciled with each other; and
 change the titles of the databases having the same data to be the same title.

2. The system according to claim 1 wherein the at least one processor automatically updates the repository as data and information is added or changed to the plurality of databases.

3. The system according to claim 1 wherein the at least one processor encodes the data so that it is only visible as metadata.

4. The system according to claim 1 wherein the at least one neural network is a convolutional neural network (CNN) or a recurrent neural network (RNN).

5. The system according to claim 1 wherein the entity is a bank and the users are bank employees.

6. The system according to claim 1 wherein the inconsistencies include misstatements in financial information and financial errors.

7. A method for determining whether inconsistencies exist in an entity's shared databases using a machine learning model, said method comprising:
 providing a repository having a plurality of databases each storing data and information where the data and information is available to authorized users, said plurality of databases being shared by multiple users across multiple divisions and organizations associated the entity;
 updating and revising the plurality of databases as the data and information stored therein changes and new data and information becomes available by the users;
 processing the databases and the data and information contained therein using the machine learning model to determine whether inconsistencies in the data and information exist in and across the plurality of databases including determining if a name of a database is consistent with the data in the database,
 wherein the machine learning model uses at least one neural network having nodes that have been trained to determine whether inconsistencies in the data and information exist in the plurality of databases,
 wherein the machine learning model trains the nodes in the at least one neural network by unsupervised learning and by training nodes in a neural network simulation model that is a simulation of the at least one neural network, said neural network simulation model employing training data to train the nodes in the neural network simulation model for determining whether inconsistencies in the data and information exist in the plurality of databases and exist in a target variable, said target variable being a variable in the neural network simulation model,
 wherein the unsupervised learning of the at least one neural network configures the at least one neural network to generate a self-organizing map, to reduce the dimensionally of an input data set, and to perform outlier/anomaly determinations to identify data points in the input data set that fall outside of a normal pattern of the data, wherein training the nodes in the neural network simulation model uses an iterative training and testing loop that incorporates weights associated with the nodes in the neural network simulation model and iterative calculations that are tested, compared to the target variable and updated in subsequent iterative calculations to improve predictability of the target variable, wherein training the nodes in the neural network simulation model includes ingesting incoming data by cleaning and transforming new training data into a format that the neural network simulation model can digest, wherein as newly trained neural network simulation models are generated from new data, preprocessing steps are tied to the newly trained neural network simulation model, and when the preprocessing is updated with newly ingested data, an updated neural network simulation model is generated, wherein processing the databases and the data and information includes renaming the databases if the type of data contained therein changes, analyzing and filtering the data so that the databases that have the same data are identified and reconciled with each other and changing the titles of the databases having the same data to be the same title; and taking remedial steps to remove the inconsistencies from the databases.

8. The method according to claim 7 wherein processing the databases and the data and information includes automatically updating the repository as data and information is added or changed to the plurality of databases.

9. The method according to claim 7 wherein processing the databases and the data and information includes encoding the data so that it is only visible as metadata.

10. The method according to claim 7 wherein the entity is a bank and the users are bank employees.

* * * * *